US011509745B2

United States Patent
Alam et al.

(10) Patent No.: US 11,509,745 B2
(45) Date of Patent: Nov. 22, 2022

(54) EFFICIENT REMOTE FUNCTION EXECUTION IN AN INFORMATION CENTRIC NETWORK

(71) Applicant: Intel Corporation, Santa Clara, CA (US)

(72) Inventors: S. M. Iftekharul Alam, Hillsboro, OR (US); Yi Zhang, Portland, OR (US); Satish Chandra Jha, Hillsboro, OR (US); Kuilin Clark Chen, Hillsboro, OR (US); Kathiravetpillai Sivanesan, Portland, OR (US); Stepan Karpenko, Hillsboro, OR (US); Srikathyayani Srikanteswara, Portland, OR (US); Venkatesan Nallampatti Ekambaram, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 16/457,704

(22) Filed: Jun. 28, 2019

(65) Prior Publication Data

US 2019/0327340 A1    Oct. 24, 2019

(51) Int. Cl.
*H04L 43/16*    (2022.01)
*H04L 67/10*    (2022.01)
(Continued)

(52) U.S. Cl.
CPC .............. *H04L 67/63* (2022.05); *H04L 43/08* (2013.01); *H04L 43/12* (2013.01); *H04L 43/16* (2013.01); *H04L 67/10* (2013.01); *H04L 67/568* (2022.05)

(58) Field of Classification Search
CPC ....... H04L 67/327; H04L 43/12; H04L 43/16; H04L 67/2842; H04L 65/80; H04L 43/10; H04L 43/08; H04L 67/10
See application file for complete search history.

(56) References Cited

U.S. PATENT DOCUMENTS

| 2014/0189060 | A1* | 7/2014 | Westphal | ............. H04L 67/289 709/217 |
| 2015/0134781 | A1* | 5/2015 | Silberstein | ............. G06F 16/70 709/219 |

(Continued)

OTHER PUBLICATIONS

Krol, Michal, "NFaaS: named function as a service", In Proceedings of the 4th ACM Conference on Information-Centric Networking. ACM, (2017), 11 pgs.

(Continued)

*Primary Examiner* — Lesa M Kennedy
(74) *Attorney, Agent, or Firm* — Schwegman Lundberg & Woessner, P.A.

(57) ABSTRACT

Systems and techniques for efficient remote function execution in an information centric network (ICN) are described herein. For example, a requestor node may transmit an admission probe interest packet. Here, the admission probe interest packet includes a name that includes a function. The admission probe interest packet also includes a metric of a parameter of the function. In response, the requestor node may receive a manifest data packet. The manifest includes a metric of function execution at a node that created the manifest data packet. The manifest also includes a name of an implementation of the function. The requestor node may then determine that the metric of function execution meets a threshold and transmit an interest packet that includes the name of the implementation of the function.

24 Claims, 6 Drawing Sheets

(51) Int. Cl.
    *H04L 43/08*     (2022.01)
    *H04L 67/63*     (2022.01)
    *H04L 67/568*     (2022.01)
    *H04L 43/12*     (2022.01)

(56) References Cited

U.S. PATENT DOCUMENTS

2015/0312373 A1* 10/2015 Muramoto ............ H04L 67/327
    370/238
2017/0324704 A1* 11/2017 Wood ...................... H04L 63/10
2018/0145927 A1* 5/2018 Srikanteswara .... H04L 67/2876

OTHER PUBLICATIONS

Krol, Michal, "Rice: Remote method invocation in icn", Network Systems Research and Design, (2018), 39 pgs.
Shakeri, Sara, "Proactive Admission Control and Dynamic Resource Management in SDN-based Virtualized Networks", 2017 8th International Conference on the Network of the Future (NOF), (2017), 7 pgs.
Tschundin, Christian, "Named functions and cached computations", . In IEEE Consumer Communications and Networking Conference, (2014), 7 pgs.
Wissingh, B, "Information-Centric Networking (ICN): CCN and NDN Terminology", [Online]. Retrieved from the Internet: URL: https: tools.ietf.org html draft-irtf-icnrg-terminology-01, (Oct. 22, 2018), 36 pgs.

* cited by examiner

US 11,509,745 B2

EFFICIENT REMOTE FUNCTION EXECUTION IN AN INFORMATION CENTRIC NETWORK

TECHNICAL FIELD

Embodiments described herein generally relate to computer networking and more specifically to decreasing overhead in remote function execution over an information centric network (ICN).

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

Named Function Networking (NFN) and Named Function as a Service (NFaaS) (collectively referred to as NFN herein) are two extensions to ICN that enable name-based remote function execution. Parameter passing is an important consideration in NFN. Generally, useful functions operate upon data sets, which are sometimes large, passed to the function as arguments or parameters. For example, to transcode a video feed from a mobile camera involves transferring data in the range of a few megabytes.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Parameters may be provided to an NFN function via an interest packet. This may present some issues, however. For example, while offloading a computing request (e.g., transcoding) to an edge or service provider node over NFN, transfer of the input data (e.g., video to be transcoded) as part of interest packet, significant communication bandwidth may be consumed in the network before reaching an edge node capable of fulfilling the request. That is, adding larger sets of parameters to an interest packet may incur additional unsolicited traffic in the network. This issue is aggravated if an edge node cannot fulfill the computing request due to underlying workload. In such case, the bandwidth to transfer the parameters will be wasted.

Some ICN-based remote function execution techniques perform remote function execution by dynamically resolving functions within a network. For example, a function parameter may be passed as a special field or meta data in interest packets. In an example, a handshaking mechanism to transfer function parameters in a special data packet may be used. Issues may persist, however. For example, possible compute nodes are not probed to determine their capability to execute a requested function (e.g., task, computation, etc.). Thus, the practice of transferring the function parameters—either via interest packet additional fields or special data packet—without getting admission control acknowledgment from the computing node may still lead to unnecessary data (e.g., function input parameters) transfer, which may impact the performance of network. This problem may be exacerbated for dense wireless networks.

To address the issues noted above, a pro-active admission control mechanism may be used. This mechanism actively probes a potential NFN node to determine whether the node is able to execute the function within specified delay parameters. In an example, higher level representations of function parameters (e.g., input data size, configuration parameters, etc.) are shared with the potential NFN node to determine the likelihood of function execution or estimated execution time before sharing large input data sets as function parameters. In an example, because there may be different implementations of a function available, the NFN node shares an estimated time for different implementations with the requesting node via a special data packet or manifests. These techniques reduce unnecessary data transmission generally and avoid the wasteful practice of sending input data to an NFN node that will not be able to acceptably perform the function.

Figure 1:
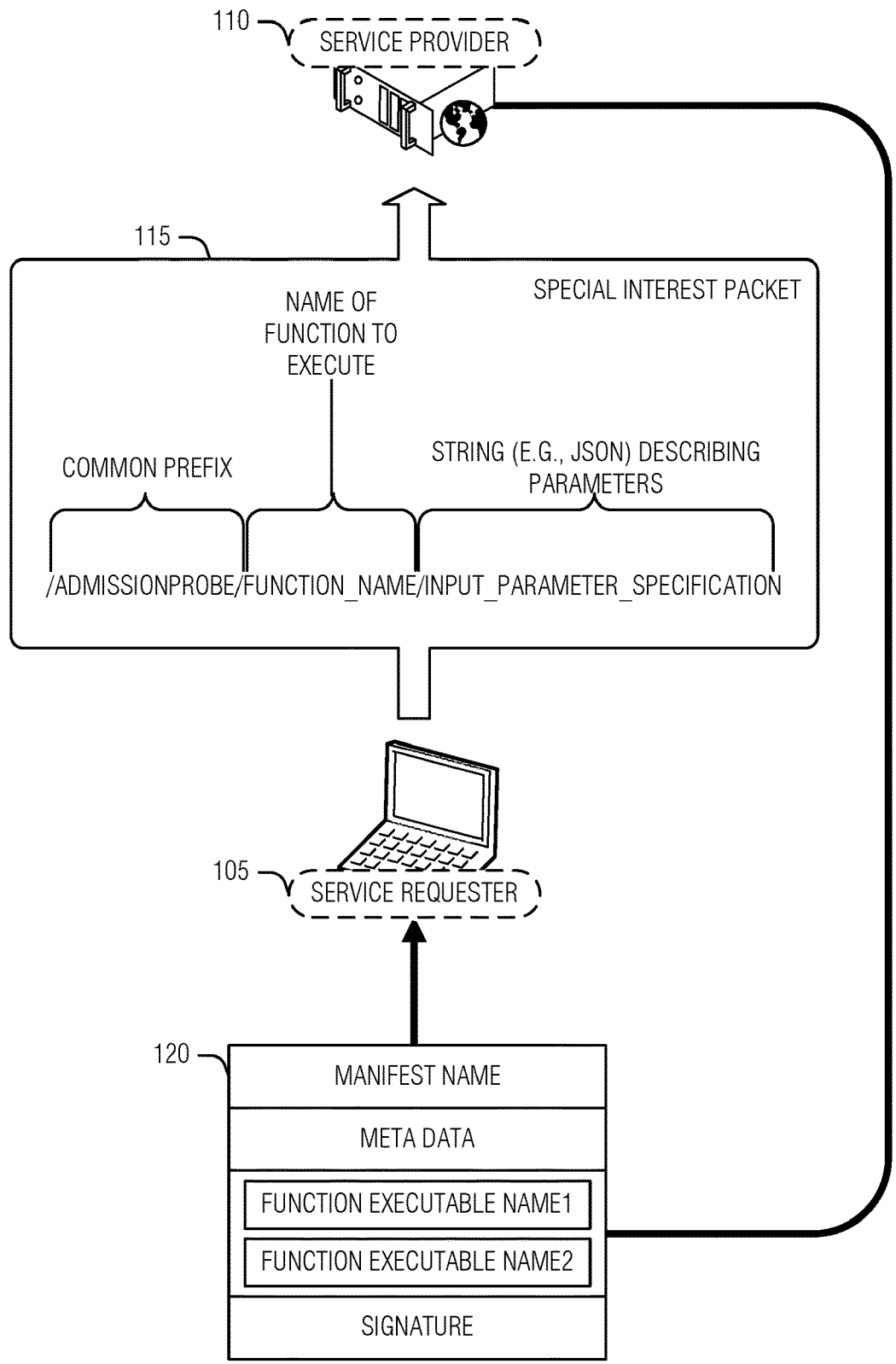
FIG. 1 illustrates an example of an ICN environment with a special interest packet format and a manifest describing available functions to execute at a remote node, according to an embodiment.

FIG. 1 illustrates an example of an ICN environment with a special interest packet 115 format and a manifest 120 describing available functions to execute at a remote node 110, according to an embodiment. As noted above, in an NFN, a service requestor node 105 sends an interest packet 115 with the function name to be executed. In traditional NFN techniques, the interest packet 115 contains all the necessary input parameters for the function. Upon receiving the interest packet 115, a forwarding node checks whether it will be able to perform the function—e.g., does the forwarding node have the function executable stored locally and enough compute resources available. If so, the forwarding node becomes the service provider 110 and it instantiates the function with the input parameters received in the interest packet 115. Once execution is complete, results are returned to the service requestor 105 as a data packet following standard ICN practice.

Because the service provider node 110 may be able to simultaneously execute multiple functions—e.g., on different virtual machines or containers—system utilization for the service provider node 110 may vary from moment to moment. Thus, depending on the service provider node's load and minimum resource requirements of a requested function, the service provider node 110 may not be able to execute a function at a given time. Due to the dynamics of system utilization, it is not efficient to share such load information periodically to the service requestor 105 because the load information soon may become obsolete.

To address these interaction issues, a pro-active query mechanism is used to fetch, by a service requestor node 105, available function implementations or associated meta data from the service provider node 110. Such meta data may include such things as estimated execution time, output specifications, function version etc. In an example, the query mechanism is implemented as a standalone method. This method has a well-defined interface to a service requestor application running on the service requestor node 105. In an example, the query mechanism is implemented as an underlying method for existing NFN frameworks. Here, the mechanism may be triggered upon reception of an NFN interest packet at the service provider node 110 and remains transparent to other NFN procedures.

In practice, the service requestor node 105 may transmit a special interest packet 115 to the service provider node 110. This interest packet may be called an "admission probe," because it is used to determine if the service provider node 110 is able to admit (e.g., execute) the function. The name of the admission probe interest packet 115 may include three parts, as illustrated in FIG. 1. The first part is a common prefix. Although any prefix may be used that the service provider node 110 understands to be an admission probe, the illustrated example is "/admission-Probe." The second part of the name is the requested function name (e.g., name of the function to execute).

The third part of the name is a high-level specification of the input parameters. The high-level specification of the input parameters are details about each function parameter. Such details may include a type of input data or a size of input data. In an example, if the input data is small enough (e.g., below a threshold) then the input data itself may be included. In an example, the high-level specification is a string serialized version of multiple data fields. An example of such a structure is the JavaScript Object Notation (JSON) string format.

In an example, the admission probe interest packet 115 may include a name of the publisher field. For example, while some service requestor nodes may not care (e.g., do not have a restriction on) which function implementation is used, other nodes may be restricted as to which implementation is used. Different publishers (e.g., function implementers or requestors) also may want the input parameters formatted in a certain way. Accordingly, including the name of the publisher in the interest packet 115 may be used to provide these distinctions to the service provider node 110.

In an example, the admission probe interest packet 115 may include a required completion time field. This field helps to save a transmission from the service provider node 110 if it determines the expected execution time is greater than the required time. For machine learning (ML)-based functions—such as those implemented by an artificial neural network (ANN)—additional sub-fields may be used to specify an error tolerance level, a minimum number of gradient iterations, a max batch size, etc., many of which may also inform the function execution time. In an example, an ML architecture may be specified. For example, the number of ANN layers to use. In an example, the service provider node 110 may response with ML options that, perhaps, detail tradeoffs between option in terms of their accuracy or their execution time.

In an example, the admission probe interest packet 115 may include a security requirement field. For example, some computations for the service requestor 110 may contain sensitive information (e.g., other people's data, protected government data, etc.). In these circumstances, security guarantees for execution, such as executing the function on a secure enclave, may be required by the service requestor node 105. By including it in the admission probe interest packet 115, the service provider node 110 may be able to reject the request before the input data is sent.

Upon reception of the admission probe interest packet 115, the service provider node 110 checks its function store and determines available implementations of the requested functions. The available implementations may be provided by different publishers, or may vary in version, or type. Type, here, refers to various options, such as, a single-threaded or multi-threaded implementation, a memory-optimized or CPU-intensive version, different output specifications etc.

In an example, for each of the available versions of the function, the service provider node 110 estimates the minimum resources required to execute the function as well as an estimated execution time. This information is composed into a special data packet, here called a "manifest" 120 or "catalog." The manifest 120 includes a list of function names of various versions and corresponding meta data—e.g., predicted execution time, output specification, cost of execution in terms of CPU cycles and memory bandwidth, etc.

In an example, the manifest 120 may include generic meta data regarding the service provider node 110. Such generic meta data may include availability, failure probability, or distributed coded computing capability. This last indicator may be particularly important for distributed computing applications.

Once created, the manifest 120 is sent to service requestor node 105 in response to its admission probe interest packet 115. In an example, if the manifest does not contain all of the data referred to within it, these data fields may include full names of the missing data or meta data. These full names may then be used by the service requestor node 105 to retrieve the missing data via the ICN.

Figure 2:
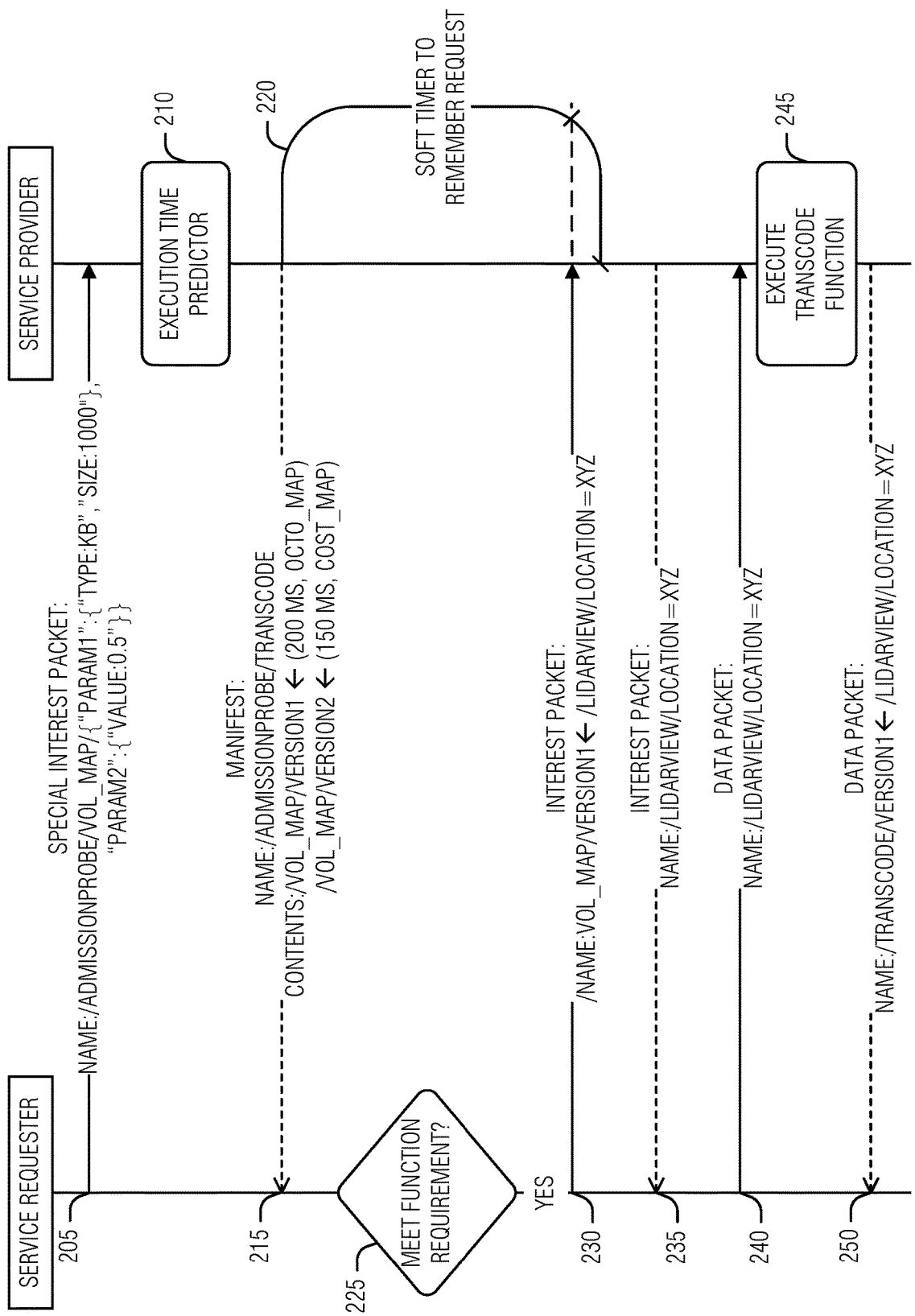
FIG. 2 is an example of a data flow for a successful remote function execution, according to an embodiment.

FIG. 2 is an example of a data flow for a successful remote function execution, according to an embodiment. Specifically, FIG. 2 illustrates an example exchange of an admission probe interest and a manifest between a service requestor node and a service provider node. In this example, the service requestor node is sending an admission probe interest for the function named 'vol_map' as it is interested in detecting an object boundary (e.g., volumetric representation of objects) from a light detection and ranging (Li-DAR) sensor trace (message 205). The service provider has the executable for 'vol_map' stored locally. The raw sensor data for this example, however, is in the range of few megabytes, which is greater than the system-defined minimum parameter size for the admission probe interest packet. Hence, the admission probe interest packet contains a JSON string with specifications for the function parameters. The first entry indicates the size of raw sensor trace. The second entry indicates the resolution of a volumetric map as a single floating-point number.

Here, the service provider node has two different implementations of this function: the first outputs data in a 3D octree format; the second outputs a 2D cost map. The service provider calculates an execution time predictor (operation 210). The service provider then creates a manifest packet (message 215) data packet and sends it back to the requestor. Here, the manifest contains full names to these two function implementations with the additional meta data of the estimated execution time and output format for each of the two function implementations.

The service provider also starts a soft timer (operation 220) to maintain states specific to the function execution request. The soft timer value also may be optionally fed back to requestor via the manifest, informing the requestor how long the provider will reserve the resources to perform the functions.

Figure 3:
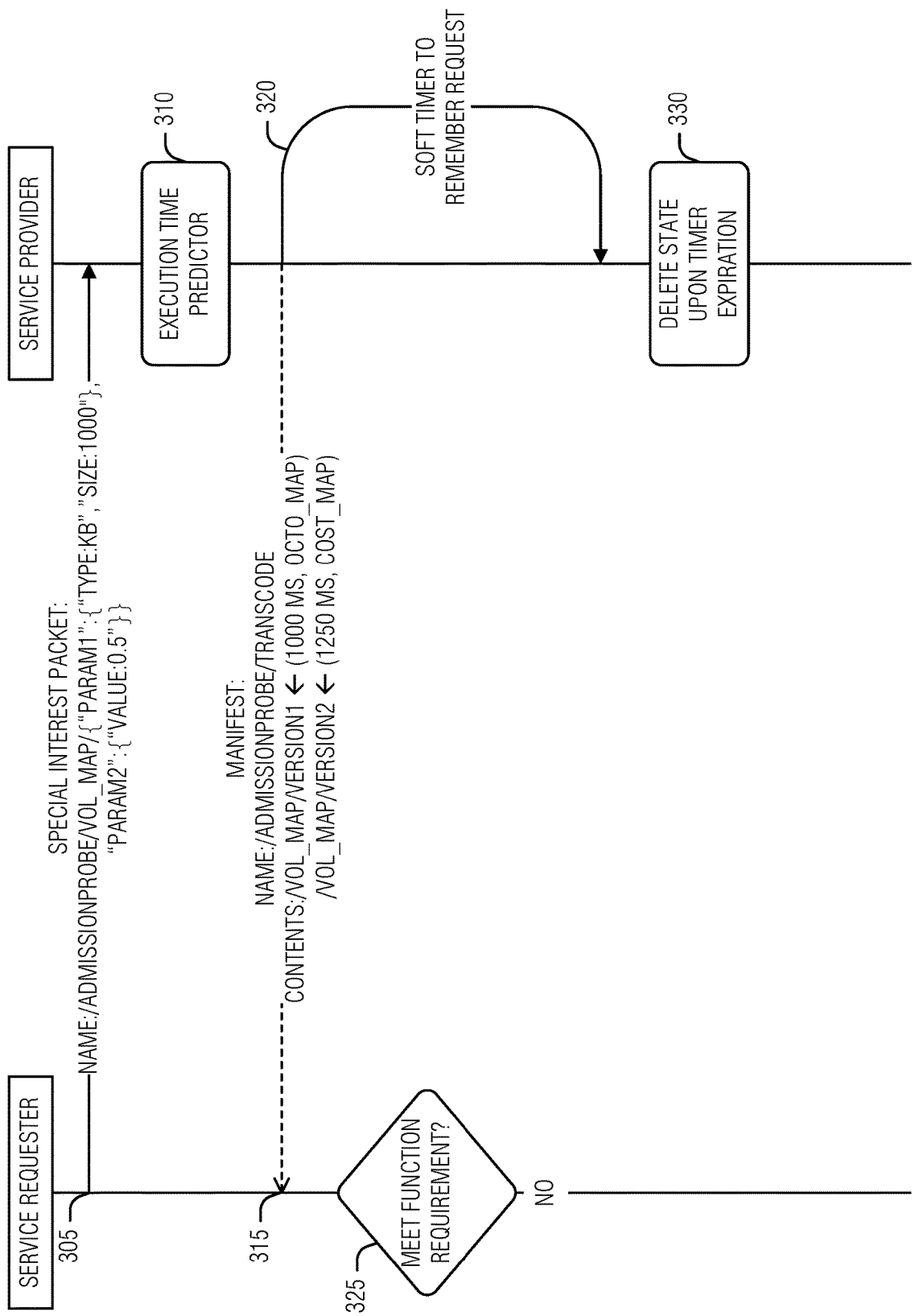
FIG. 3 is an example of a data flow for an unsuccessful remote function execution, according to an embodiment.

The requestor receives the manifest packet and determines which implementation satisfies its function need (decision 225). FIG. 3, described below, illustrates an example where the implementation does not satisfy the requestor need. The requestor then sends an interest packet containing full name of the chosen version of the function and a name or reference to the sensor data input to the function (message 230). Upon reception of this interest packet, service provider cancels the soft timer it started during the admission probe process. After that, it follows standard ICN mechanism to fetch input data and transfer computation results, here illustrated by an interest packet for the sensor data (message 235), a subsequent data packet that contains the sensor data (message 240), the service provider performs the function (operation 245), and finally a data packet that includes the results of the computation (message 250).

FIG. 3 is an example of a data flow for an unsuccessful remote function execution, according to an embodiment. This example is like that described above with respect to FIG. 2. Accordingly, the admission probe interest (message 305) is transmitted to the service provider. The service provider gathers meta data about the proposed function execution (e.g., estimate execution time in operation 310), and responds to the service requestor with a manifest 315. The service provider also starts the soft-timer (operation 320).

The example illustrated here differs from that described in FIG. 2 in that the service provider proposes an expected execution time that is much longer than the function requirement provided in the admission probe interest packet (decision 325). In an example, upon reception of such manifests—e.g., that demonstrate that the service provider will not execute the function within the operational parameters—the service requestor stops the process by not sending a function execution request to this service provider. The service requestor may proceed via additional admission probe interest packets directed to other neighboring service provider nodes, but otherwise avoids unnecessary transmission of large function parameter data. In the illustrated example, upon expiration of the soft timer, the service provider frees resources reserved for executing the function (operation 330).

In an example, the admission probe packet may contain an optional "required completion time" field. If this field is included, the service provider may respond with a negative acknowledgment (NACK) if the estimated completion time for all the available functions exceeds the required completion time. In an example, a NACK packet from the requestor node also may be used to trigger an immediate resource release at the service provider node. This may be a useful resource management technique because, upon reception of an admission probe interest packet, the service provider node will generally reserve some resources to perform the function execution request. Here, instead of waiting for the soft timer to expire, the requestor node explicitly releases these resources via the NACK.

In an example, the function admission control techniques may be expanded for distributed function computation. For example, the service requester selects a set of service provider nodes to use for a distributed computation. The service requestor may then query these service provider nodes. Each service provider node may reply with their respective availability and reliability estimate to indicate that they may be active for some percent of the time with a certain failure rate. Since many distributed applications and ML algorithms are robust to failures and delays, it might suffice for the service requestor to choose a subset of service provider nodes based on their availability and failure rate. This may also help the service requester to dynamically choose more nodes as needed in case, for example, the distributed function execution is taking too long. Furthermore, the service provider nodes may indicate their ability to perform coded computation in their respective manifests. Based on this information, the service requestor may instruct that the selected service provider nodes use coded distributed computation for better error tolerance.

Figure 4:
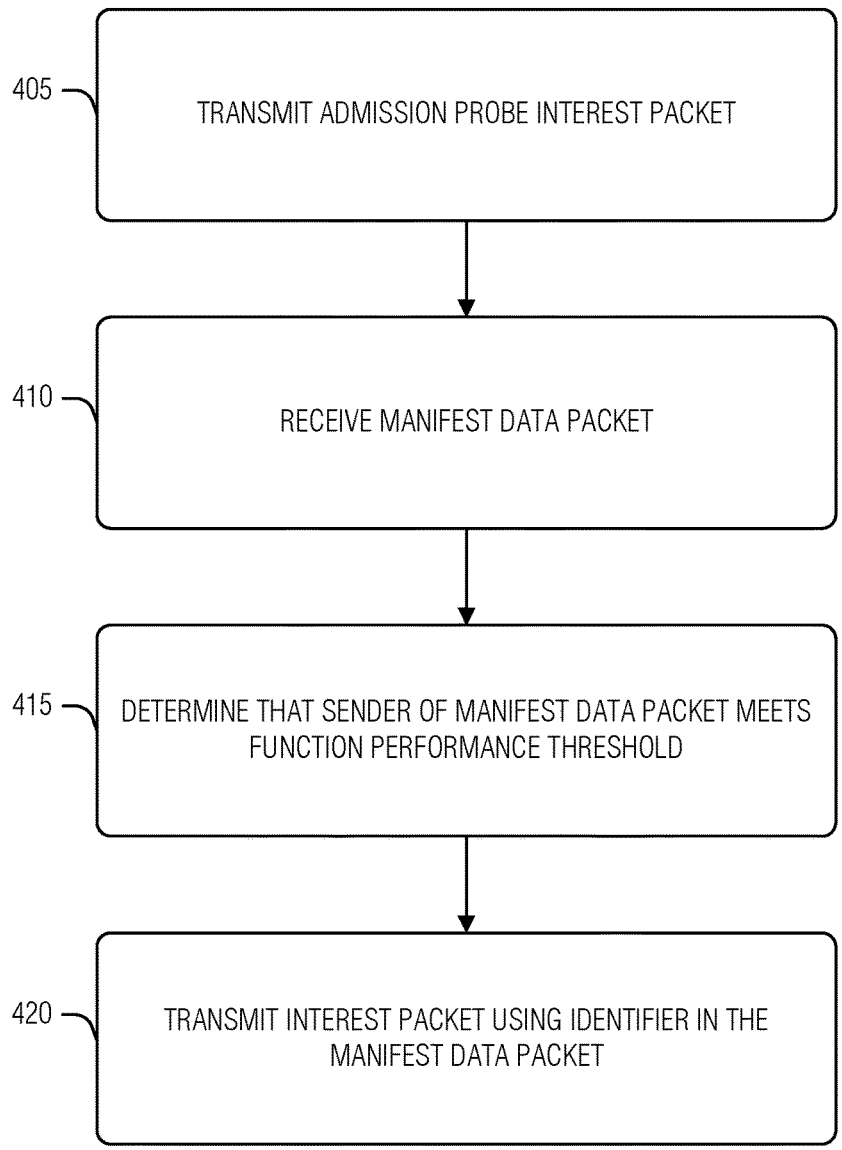
FIG. 4 is an example of a method for efficient remote function execution in an ICN, according to an embodiment.

FIG. 4 is an example of a method 400 for efficient remote function execution in an ICN, according to an embodiment. The operations of the method 400 are implemented in computing hardware, such as that described in FIG. 5 or 6 (e.g., processing circuitry).

At operation 405, an admission probe interest packet is transmitted from a requestor node. Here, the admission probe interest packet includes a name that includes a function identification. The admission probe interest packet also includes a metric of a parameter to the function. In an example, the name used in the admission probe interest packet has a prefix identifying it as an admission probe interest packet.

In an example, the metric of the parameter to the function is included in the name of the admission probe interest packet. Here, an object string serialization, such as JSON, may be used. Other formats may include a comma delimited list. The character selection is restricted to those for legal ICN names, however.

In an example, the metric of the parameter to the function is at least one of a size or a type of data. In an example, the metric may include an execution environment requirement. Thus, while not an input to the function itself, it is a parameter of function execution. The environment requirement may include such things as a secure enclave, a certain level of cryptography, etc.

In an example, the admission probe interest packet includes a second parameter to the function. This is different than the first parameter mentioned above in that the parameter data itself is included in the admission probe interest packet. In this case, the inclusion is based on the second parameter being smaller than a size threshold.

At operation 410, a manifest data packet is received in response to the admission probe interest packet. Here, the manifest includes a metric of function execution at a node that created the manifest data packet. The manifest also includes a name of an implementation of the function. In an example, the name of the implementation of the function differentiates different implementations of the function from each other. For example, two different versions of the same function may include a version suffix to differentiate them from each other. Other name additions may include an output type, a publisher, etc.

In an example, the metric of function execution is at least one of an estimated execution time, an execution latency, an output type, an implementation of the function, or a publisher of the function. Some of these examples relate to the name of the implementation of the function, although having differentiated names is not required. Thus, this meta data is returned to enable the requestor node to determine whether it will proceed with the provider node that transmitted the manifest.

At operation 415, the requestor node determines that the metric of function execution meets a threshold. Here, the threshold may be a maximum, for example, when the metric is an execution time. Thus, if the metric is below the threshold, the function execution at the provider node is acceptable. In an example, the function may be a match, such as may be true when the requestor node is attempting to get a function implementation created by a certain publisher of functions.

At operation 420, an interest packet that includes the name of the implementation of the function is transmitted when the requestor node determines that the metric of the function execution meets the threshold. In an example, the interest packet includes a name of the parameter of the function. In this case, the return interest does not transmit the data for input to the function, but rather provides the ICN name that the provider node will use to retrieve the data.

In an example, the operations of the method 400 may be extended to include receiving a second manifest in response to the admission probe interest packet. Here, the second manifest originates from a second provider node. Here, the requestor node determines that the metric of function execution in the second manifest does not meet a required threshold. In this case, in an example, the requestor node transmits a NACK in response to the metric of function execution in the second manifest not meeting the required threshold. This NACK may operate as an explicit resource release at the second provider node. However, in an example, the requestor node takes no further action with respect to the second manifest.

Figure 5:
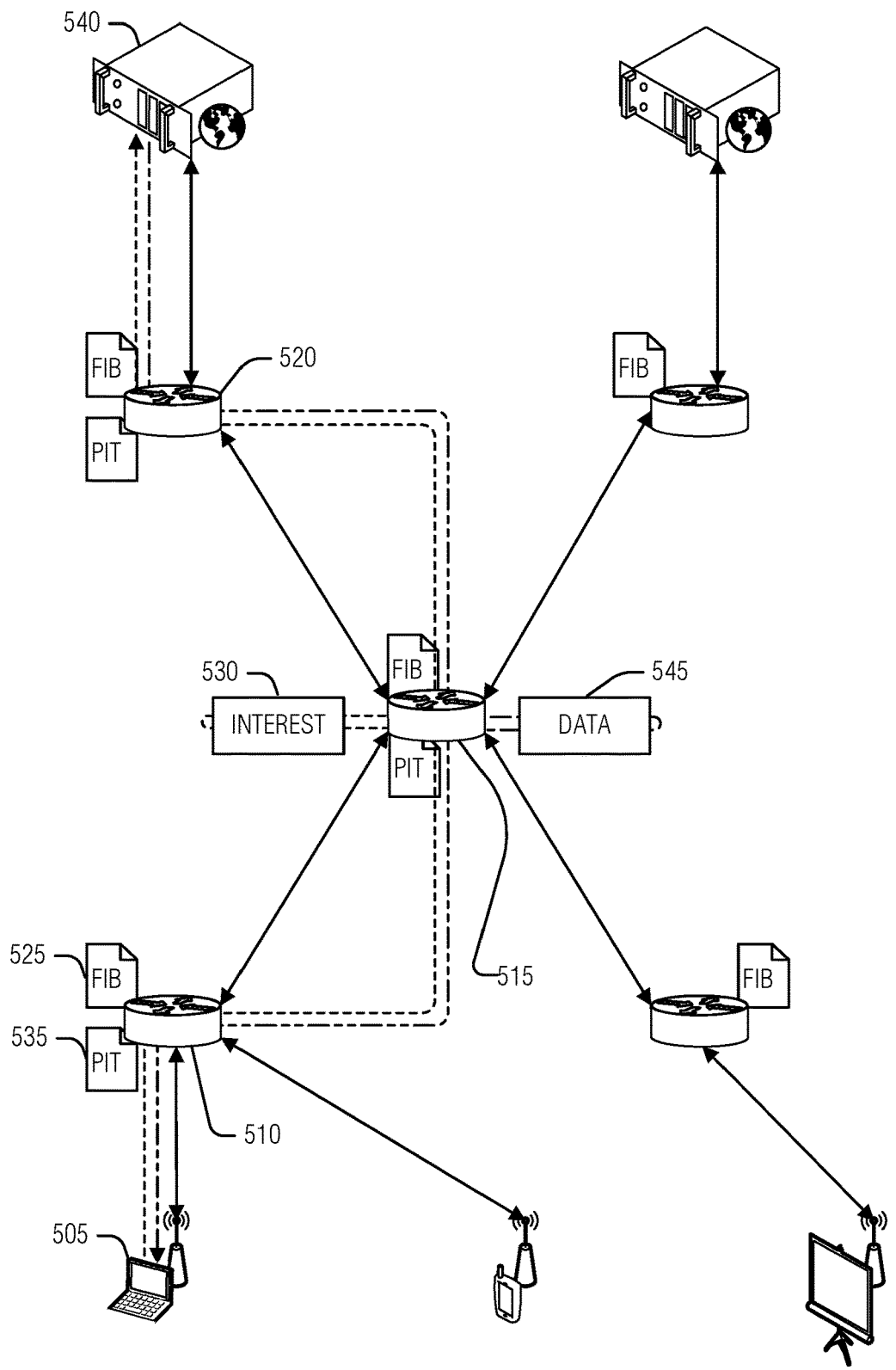
FIG. 5 illustrates an example ICN, according to an embodiment.
Figure 6:
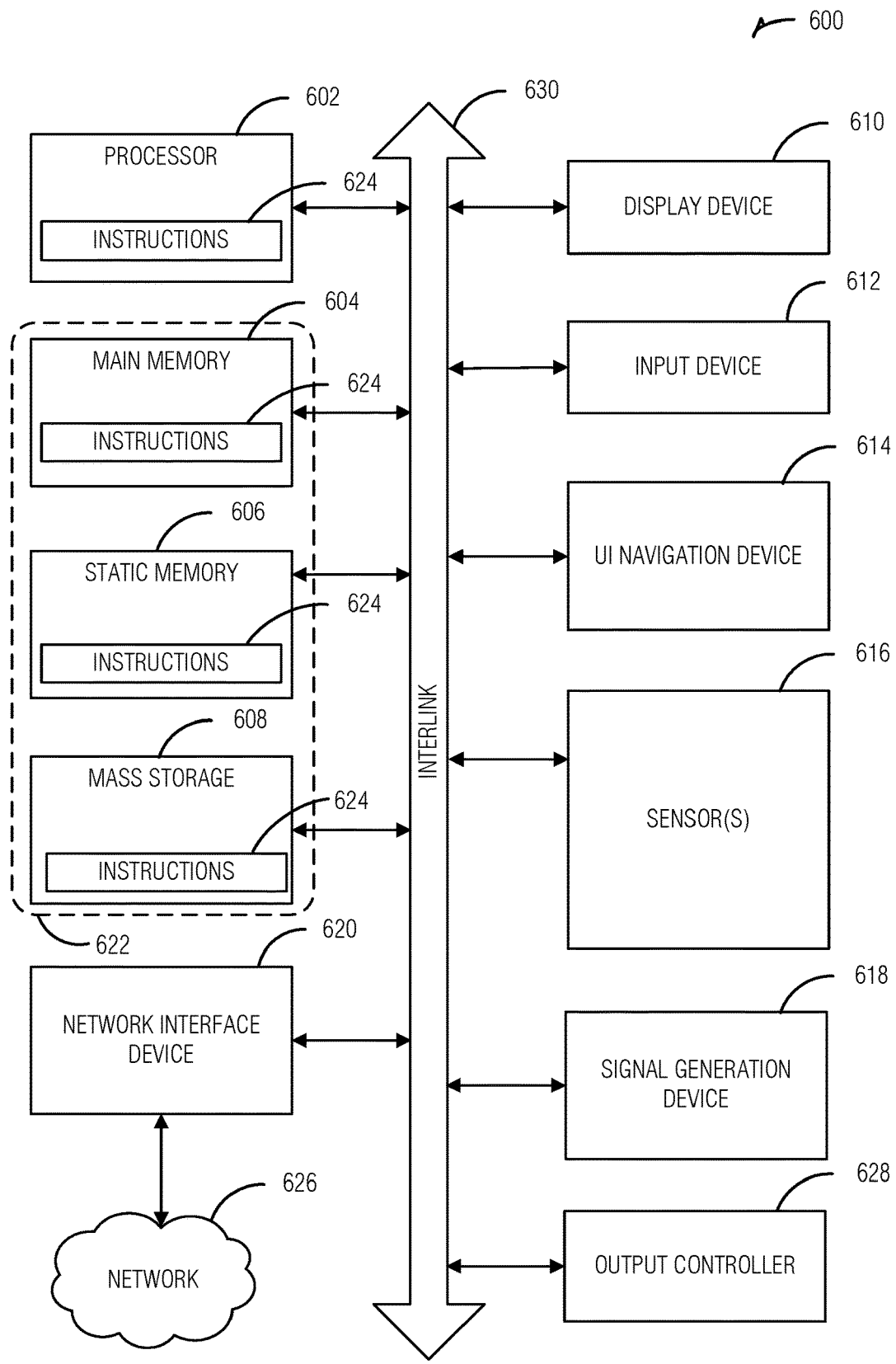
FIG. 6 is a block diagram illustrating an example of a machine upon which one or more embodiments may be implemented.

FIGS. 5 and 6 below provide additional details of the components in FIG. 1. For example, FIG. 5 illustrates several details and variations in ICNs. FIG. 6 illustrates several examples of computer hardware that may be used to implement any of the components illustrated in FIG. 1.

FIG. 5 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 505 (e.g., subscriber) requests named content from the network itself. The content request may be called an interest and transmitted via an interest packet 530. As the interest packet traverses network devices (e.g., network elements, routers, switches, hubs, etc.)—such as network elements 510, 515, and 520—a record of the interest is kept, for example, in a pending interest table (PIT) at each network element. Thus, network element 510 maintains an entry in its PIT 535 for the interest packet 530, network element 515 maintains the entry in its PIT, and network element 520 maintains the entry in its PIT.

When a device, such as publisher 540, that has content matching the name in the interest packet 530 is encountered, that device 540 may send a data packet 545 in response to the interest packet 530. Typically, the data packet 545 is tracked back through the network to the source (e.g., device 505) by following the traces of the interest packet 530 left in the network element PITs. Thus, the PIT 535 at each network element establishes a trail back to the subscriber 505 for the data packet 545 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 530 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 530 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 530 to data cached in the ICN element. Thus, for example, if the data 545 named in the interest 530 is cached in network element 515, then the network element 515 will return the data 545 to the subscriber 505 via the network element 510. However, if the data 545 is not cached at network element 515, the network element 515 routes the interest 530 on (e.g., to network element 520). To facilitate routing, the network elements may use a forwarding information base 525 (FIB) to match named data to an interface (e.g., physical port) for the route. Thus, the FIB 525 operates much like a routing table on a traditional network device.

In an example, additional meta-data may be attached to the interest packet 530, the cached data, or the route (e.g., in the FIB 525), to provide an additional level of matching. For example, the data name may be specified as "www.somedomain.com or videos or v8675309," but also include a version number—or timestamp, time range, endorsement, etc. In this example, the interest packet 530 may specify the desired name, the version number, or the version range. The matching may then locate routes or cached data matching the name and perform the additional comparison of meta-data or the like to arrive at an ultimate decision as to whether data or a route matches the interest packet 530 for respectively responding to the interest packet 530 with the data packet 545 or forwarding the interest packet 530.

ICN has advantages over host-based networking because the data segments are individually named. This enables aggressive caching throughout the network as a network element may provide a data packet 530 in response to an interest 530 as easily as an original author 540. Accordingly, it is less likely that the same segment of the network will transmit duplicates of the same data requested by different devices.

Fine grained encryption is another feature of many ICN networks. A typical data packet 545 includes a name for the data that matches the name in the interest packet 530. Further, the data packet 545 includes the requested data and may include additional information to filter similarly named data (e.g., by creation time, expiration time, version, etc.). To address malicious entities providing false information under the same name, the data packet 545 may also encrypt its contents with a publisher key or provide a cryptographic hash of the data and the name. Thus, knowing the key (e.g., from a certificate of an expected publisher 540) enables the recipient to ascertain whether the data is from that publisher 540. This technique also facilitates the aggressive caching of the data packets 545 throughout the network because each data packet 545 is self-contained and secure. In contrast, many host-based networks rely on encrypting a connection between two hosts to secure communications. This may increase latencies while connections are being established and prevents data caching by hiding the data from the network elements.

Example ICN networks include: content centric networking (CCN)—as specified in the Internet Engineering Task Force (IETF) draft specifications for CCNx 0.x and CCN 1.x; named data networking (NDN)—as specified in the NDN technical report DND-0001; Data-Oriented Network Architecture (DONA)—as presented at proceedings of the 2007 Association for Computing Machinery's (ACM) Special Interest Group on Data Communications (SIGCOMM) conference on Applications, technologies, architectures, and protocols for computer communications; Named Functions Networking (NFN); 4WARD; Content Aware Searching, Retrieval and Streaming (COAST); Convergence of Fixed and Mobile Broadband Access/Aggregation Networks (COMBO); Content Mediator Architecture for Content-Aware Networks (COMET); CONVERGENCE; GreenICN; Network of Information (NetInf); IP Over ICN (POINT); Publish-Subscribe Internet Routing Paradigm (PSIRP); Publish Subscribe Internet Technology (PURSUIT); Scalable and Adaptive Internet Solutions (SAIL); Universal, Mobile-Centric and Opportunistic Communications Architecture (UMOBILE); among others.

FIG. 6 illustrates a block diagram of an example machine 600 upon which any one or more of the techniques (e.g., methodologies) discussed herein may perform. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drive, tape drive, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

ADDITIONAL NOTES & EXAMPLES

Example 1 is a device for efficient remote function execution in an information centric network (ICN), the device comprising: processing circuitry in a requestor node; and memory including instructions that, when the device is in operation, configure the processing circuitry to: transmit an admission probe interest packet, the admission probe interest packet including a name that includes a function, the admission probe interest packet including a metric of a parameter of the function; receive a manifest data packet in response to the admission probe interest packet, the manifest including a metric of function execution at a node that created the manifest data packet, the manifest including a name of an implementation of the function; determine that the metric of function execution meets a threshold; and transmitting an interest packet that includes the name of the implementation of the function.

In Example 2, the subject matter of Example 1, wherein the metric of the parameter of the function is included in the name of the admission probe interest packet.

In Example 3, the subject matter of any of Examples 1-2, wherein the metric of the parameter of the function is at least one of a size or a type of data.

In Example 4, the subject matter of any of Examples 1-3, wherein the interest packet includes the parameter of the function.

In Example 5, the subject matter of any of Examples 1-4, wherein the interest packet includes a name of the parameter of the function.

In Example 6, the subject matter of any of Examples 1-5, wherein the admission probe interest packet includes a second parameter of the function, the second parameter below a size threshold.

In Example 7, the subject matter of any of Examples 1-6, wherein the metric of function execution is at least one of an estimated execution time, an execution latency, an output type, an implementation of the function, or a publisher of the function.

In Example 8, the subject matter of any of Examples 1-7, wherein the name of the implementation of the function differentiates different implementations of the function from each other.

In Example 9, the subject matter of any of Examples 1-8, wherein the instructions further configure the processing circuitry to receive a second manifest in response to the admission probe interest packet, the second manifest originating from a second provider node.

In Example 10, the subject matter of Example 9, wherein the instructions further configure the processing circuitry to determine that the metric of function execution in the second manifest does not meet a required threshold.

In Example 11, the subject matter of Example 10, wherein the instructions further configure the processing circuitry to transmit a negative acknowledgment (NACK) in response to the metric of function execution in the second manifest not meeting the required threshold.

In Example 12, the subject matter of any of Examples 10-11, wherein the requestor node takes no further action with respect to the second manifest.

Example 13 is a method for efficient remote function execution in an information centric network (ICN), the method comprising: transmitting, at a requestor node, an admission probe interest packet, the admission probe interest packet including a name that includes a function, the admission probe interest packet including a metric of a parameter of the function; receiving a manifest data packet in response to the admission probe interest packet, the manifest including a metric of function execution at a node that created the manifest data packet, the manifest including a name of an implementation of the function; determining that the metric of function execution meets a threshold; and transmitting an interest packet that includes the name of the implementation of the function.

In Example 14, the subject matter of Example 13, wherein the metric of the parameter of the function is included in the name of the admission probe interest packet.

In Example 15, the subject matter of any of Examples 13-14, wherein the metric of the parameter of the function is at least one of a size or a type of data.

In Example 16, the subject matter of any of Examples 13-15, wherein the interest packet includes the parameter of the function.

In Example 17, the subject matter of any of Examples 13-16, wherein the interest packet includes a name of the parameter of the function.

In Example 18, the subject matter of any of Examples 13-17, wherein the admission probe interest packet includes a second parameter of the function, the second parameter below a size threshold.

In Example 19, the subject matter of any of Examples 13-18, wherein the metric of function execution is at least one of an estimated execution time, an execution latency, an output type, an implementation of the function, or a publisher of the function.

In Example 20, the subject matter of any of Examples 13-19, wherein the name of the implementation of the function differentiates different implementations of the function from each other.

In Example 21, the subject matter of any of Examples 13-20, comprising receiving a second manifest in response to the admission probe interest packet, the second manifest originating from a second provider node.

In Example 22, the subject matter of Example 21, comprising determining that the metric of function execution in the second manifest does not meet a required threshold.

In Example 23, the subject matter of Example 22, comprising transmitting a negative acknowledgment (NACK) in response to the metric of function execution in the second manifest not meeting the required threshold.

In Example 24, the subject matter of any of Examples 22-23, wherein the requestor node takes no further action with respect to the second manifest.

Example 25 is at least one machine-readable medium including instructions for efficient remote function execution in an information centric network (ICN), the instructions, when executed by processing circuitry, cause the processing circuitry to perform operations comprising: transmitting, at a requestor node, an admission probe interest packet, the admission probe interest packet including a name that includes a function, the admission probe interest packet including a metric of a parameter of the function; receiving a manifest data packet in response to the admission probe interest packet, the manifest including a metric of function execution at a node that created the manifest data packet, the manifest including a name of an implementation of the function; determining that the metric of function execution meets a threshold; and transmitting an interest packet that includes the name of the implementation of the function.

In Example 26, the subject matter of Example 25, wherein the metric of the parameter of the function is included in the name of the admission probe interest packet.

In Example 27, the subject matter of any of Examples 25-26, wherein the metric of the parameter of the function is at least one of a size or a type of data.

In Example 28, the subject matter of any of Examples 25-27, wherein the interest packet includes the parameter of the function.

In Example 29, the subject matter of any of Examples 25-28, wherein the interest packet includes a name of the parameter of the function.

In Example 30, the subject matter of any of Examples 25-29, wherein the admission probe interest packet includes a second parameter of the function, the second parameter below a size threshold.

In Example 31, the subject matter of any of Examples 25-30, wherein the metric of function execution is at least one of an estimated execution time, an execution latency, an output type, an implementation of the function, or a publisher of the function.

In Example 32, the subject matter of any of Examples 25-31, wherein the name of the implementation of the function differentiates different implementations of the function from each other.

In Example 33, the subject matter of any of Examples 25-32, wherein the operations comprise receiving a second manifest in response to the admission probe interest packet, the second manifest originating from a second provider node.

In Example 34, the subject matter of Example 33, wherein the operations comprise determining that the metric of function execution in the second manifest does not meet a required threshold.

In Example 35, the subject matter of Example 34, wherein the operations comprise transmitting a negative acknowledgment (NACK) in response to the metric of function execution in the second manifest not meeting the required threshold.

In Example 36, the subject matter of any of Examples 34-35, wherein the requestor node takes no further action with respect to the second manifest.

Example 37 is a system for efficient remote function execution in an information centric network (ICN), the system comprising: means for transmitting, at a requestor node, an admission probe interest packet, the admission probe interest packet including a name that includes a function, the admission probe interest packet including a metric of a parameter of the function; means for receiving a manifest data packet in response to the admission probe interest packet, the manifest including a metric of function execution at a node that created the manifest data packet, the manifest including a name of an implementation of the function; means for determining that the metric of function execution meets a threshold; and means for transmitting an interest packet that includes the name of the implementation of the function.

In Example 38, the subject matter of Example 37, wherein the metric of the parameter of the function is included in the name of the admission probe interest packet.

In Example 39, the subject matter of any of Examples 37-38, wherein the metric of the parameter of the function is at least one of a size or a type of data.

In Example 40, the subject matter of any of Examples 37-39, wherein the interest packet includes the parameter of the function.

In Example 41, the subject matter of any of Examples 37-40, wherein the interest packet includes a name of the parameter of the function.

In Example 42, the subject matter of any of Examples 37-41, wherein the admission probe interest packet includes a second parameter of the function, the second parameter below a size threshold.

In Example 43, the subject matter of any of Examples 37-42, wherein the metric of function execution is at least one of an estimated execution time, an execution latency, an output type, an implementation of the function, or a publisher of the function.

In Example 44, the subject matter of any of Examples 37-43, wherein the name of the implementation of the function differentiates different implementations of the function from each other.

In Example 45, the subject matter of any of Examples 37-44, comprising means for receiving a second manifest in response to the admission probe interest packet, the second manifest originating from a second provider node.

In Example 46, the subject matter of Example 45, comprising means for determining that the metric of function execution in the second manifest does not meet a required threshold.

In Example 47, the subject matter of Example 46, comprising means for transmitting a negative acknowledgment (NACK) in response to the metric of function execution in the second manifest not meeting the required threshold.

In Example 48, the subject matter of any of Examples 46-47, wherein the requestor node takes no further action with respect to the second manifest.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device, in a requestor node, for efficient remote function execution in an information centric network (ICN), the device comprising:
    processing circuitry; and
    memory including instructions that, when the device is in operation, configure the processing circuitry to:
        transmit an admission probe interest packet, the admission probe interest packet identified from other interest packets by an admission probe prefix, the admission probe interest packet including a name that includes a function, the admission probe interest packet including a metric of a parameter of the function;
        receive a manifest data packet in response to the admission probe interest packet, the manifest including:
            names of multiple implementations of the function that meet the metric of the parameter of the function; and
            respective metrics of function execution, for each of the multiple implementations of the function, at a provider node that created the manifest data packet, wherein the names of the multiple implementations of the function differentiate different implementations of the function from each other;
        determine that one of the metrics of function execution meets a threshold; and
        transmit an interest packet that includes the name of the implementation of the function corresponding to the metric of function execution that meets the threshold, the interest packet being a standard ICN interest packet.

2. The device of claim 1, wherein the metric of the parameter of the function is at least one of a size or a type of data.

3. The device of claim 1, wherein the metric of function execution is at least one of an estimated execution time, an execution latency, an output type, an implementation of the function, or a publisher of the function.

4. The device of claim 1, wherein the instructions further configure the processing circuitry to receive a second manifest in response to the admission probe interest packet, the second manifest originating from a second provider node.

5. The device of claim 4, wherein the instructions further configure the processing circuitry to determine that the metric of function execution in the second manifest does not meet a required threshold.

6. The device of claim 5, wherein the instructions further configure the processing circuitry to transmit a negative acknowledgment (NACK) in response to the metric of function execution in the second manifest not meeting the required threshold.

7. The device of claim 5, wherein the requestor node takes no further action with respect to the second manifest.

8. The device of claim 1, wherein the admission probe interest packet includes a second parameter of the function, the second parameter below a size threshold.

9. A method for efficient remote function execution in an information centric network (ICN), the method comprising:
transmitting, at a requestor node, an admission probe interest packet, the admission probe interest packet identified from other interest packets by an admission probe prefix, the admission probe interest packet including a name that includes a function, the admission probe interest packet including a metric of a parameter of the function;
receiving a manifest data packet in response to the admission probe interest packet, the manifest including:
names of multiple implementations of the function that meet the metric of the parameter of the function; and
respective metrics of function execution, for each of the multiple implementations of the function, at a provider node that created the manifest data packet, wherein the names of the multiple implementations of the function differentiate different implementations of the function from each other;
determining that one of the metrics of function execution meets a threshold; and
transmitting an interest packet that includes the name of the implementation of the function corresponding to the metric of function execution that meets the threshold, the interest packet being a standard ICN interest packet.

10. The method of claim 9, wherein the metric of the parameter of the function is at least one of a size or a type of data.

11. The method of claim 9, wherein the metric of function execution is at least one of an estimated execution time, an execution latency, an output type, an implementation of the function, or a publisher of the function.

12. The method of claim 9, comprising receiving a second manifest in response to the admission probe interest packet, the second manifest originating from a second provider node.

13. The method of claim 12, comprising determining that the metric of function execution in the second manifest does not meet a required threshold.

14. The method of claim 13, comprising transmitting a negative acknowledgment (NACK) in response to the metric of function execution in the second manifest not meeting the required threshold.

15. The method of claim 13, wherein the requestor node takes no further action with respect to the second manifest.

16. The method of claim 9, wherein the admission probe interest packet includes a second parameter of the function, the second parameter below a size threshold.

17. At least one non-transitory machine-readable medium including instructions for efficient remote function execution in an information centric network (ICN), the instructions, when executed by processing circuitry, cause the processing circuitry to perform operations comprising:
transmitting, at a requestor node, an admission probe interest packet, the admission probe interest packet identified from other interest packets by an admission probe prefix, the admission probe interest packet including a name that includes a function, the admission probe interest packet including a metric of a parameter of the function;
receiving a manifest data packet in response to the admission probe interest packet, the manifest including:
names of multiple implementations of the function that meet the metric of the parameter of the function; and
respective metrics of function execution, for each of the multiple implementations of the function, at a provider node that created the manifest data packet, wherein the names of the multiple implementations of the function differentiate different implementations of the function from each other;
determining that one of the metrics of function execution meets a threshold; and transmitting an interest packet that includes the name of the implementation of the function corresponding to the metric of function execution that meets the threshold, the interest packet being a standard ICN interest packet.

18. The at least one non-transitory machine-readable medium of claim 17, wherein the metric of the parameter of the function is at least one of a size or a type of data.

19. The at least one non-transitory machine-readable medium of claim 17, wherein the metric of function execution is at least one of an estimated execution time, an execution latency, an output type, an implementation of the function, or a publisher of the function.

20. The at least one non-transitory machine-readable medium of claim 17, wherein the operations comprise receiving a second manifest in response to the admission probe interest packet, the second manifest originating from a second provider node.

21. The at least one non-transitory machine-readable medium of claim 20, wherein the operations comprise determining that the metric of function execution in the second manifest does not meet a required threshold.

22. The at least one non-transitory machine-readable medium of claim 21, wherein the operations comprise transmitting a negative acknowledgment (NACK) in response to the metric of function execution in the second manifest not meeting the required threshold.

23. The at least one non-transitory machine-readable medium of claim 21, wherein the requestor node takes no further action with respect to the second manifest.

24. The at least one non-transitory machine-readable medium of claim 17, wherein the admission probe interest packet includes a second parameter of the function, the second parameter below a size threshold.

* * * * *